Patented June 1, 1948

2,442,537

UNITED STATES PATENT OFFICE 2,442,537

PUFF PASTRY SHORTENING

Eddy W. Eckey, Wyoming, Ohio, assignor to The Procter & Gamble Company, Cincinnati, Ohio, a corporation of Ohio No Drawing. Application January 22, 1947, Serial No. 723,663

3 Claims. (Cl. 260—410.7)

This invention relates to plastic shortening, and more particularly to plastic shortenings for use in the preparation of puff pastry.

The present application is a continuation-in-part of copending application Serial No. 628,372, filed November 13, 1945. In this copending application I have described and claimed the employment of my process of low temperature interesterification (set forth broadly in my copending application Serial No. 562,062, filed November 6, 1944) in the treatment of glycerides for use in edible fats and have made specific reference to the use of the process in the manufacture of plastic shortenings for use in the preparation of puff pastry. The present application is designed to describe and claim more fully this specific application of the process and the products produced thereby.

Puff pastry shortenings are used to a large extent by commercial bakers in the manufacture of a flaky, puffed type of pastry. Napoleons, pastry tarts, patty shells, turnovers, cream rolls, and cheese sticks are a few examples of products in which puff pastry shortening is used.

A detailed description of how the shortening ingredient is employed in puff pastry manufacture is given below in connection with the determination of the capacity of the shortening to assist in the development of a sharp increase in volume in the dough during baking, an important characteristic known as "spring." In general the procedure involves repeatedly rolling and folding a predominant proportion of the total shortening employed into a dough previously prepared from flour, eggs, salt, fat, and water, the idea being to obtain a rolled and folded dough ready for shaping and baking which actually consists of a large number of alternate layers of fat and dough.

Best results with regard to spring are obtained when the shortening is not absorbed appreciably by the dough and remains as a distinct layer separating two layers of dough. Apparently the success in obtaining desired puff in the pastry on baking is dependent on the degree to which the moisture in the dough is sealed in each dough layer by the alternate layers of fat. Accordingly the fat must be plastic to permit rolling and even distribution, and must not be fluid to the extent that it is absorbed appreciably by the dough.

Probably the first puff pastry shortening was butter. Later other fats came into use, but until recently these fats were confined wholly to animal fats in the form of a wet shortening containing a small amount of salt and about five percent water, presumably for the purpose of making the product butter-like in consistency and feel.

At the present time, vegetable fats are used in combination with the animal fats and in a few instances the fat ingredient of such wet shortenings is wholly constituted of vegetable fats. These all-vegetable shortenings, however, do not have in combination all of the desirable qualities of "spring," workability at low temperature, stability against the development of rancidity, freedom from waxiness, and suitable plasticity over a range of temperatures from 50 to 80° F.

It should also be mentioned that dry plastic shortenings designed for ordinary bakery use have thus far proved unsatisfactory in the manufacture of puff pastry products since under normal conditions of puff pastry manufacture their use does not result in a baked product having the desired flakiness and increased volume. In other words, these shortenings do not have desired spring.

Experimental work has indicated that in a large measure the spring of a shortening is dependent on its content of triglycerides which are solid in the fat mixture at temperatures ranging from about 80° F. to about 90° F., the higher the content of such solid triglycerides, the greater the spring. The ordinary type of plastic vegetable shortening does not contain a sufficiently high proportion of such solid triglycerides to have desired spring, and if the solid fat content thereof is increased to the desired amount, either by hydrogenation or by physical addition of partially or substantially completely hydrogenated vegetable fats, then the shortening is too firm or stiff or brittle for proper rolling and folding into the dough, or is waxy at body temperature and may thereby impart to the pastry a waxy characteristic which is unpleasant during eating. If the shortening has been prepared by the addition of a hard stock to a liquid oil, the product may have good spring and good plasticity and working characteristics over a wide range of temperature, but such products invariably have low natural stability against the development of rancidity, ordinarily not substantially more than 25 hours, and pastries prepared therefrom rapidly turn rancid especially if they are reheated in the oven to improve crispness. The stability figures referred to here and elsewhere in the application are those of King, Roschen, and Irwin, described in "Oil and Soap," vol. 10, pages 105–109 (1933) with details modified as shown in "Oil and Soap," vol. 22, pages 101–104 (1945).

It is an object of my invention to provide an all-vegetable puff pastry plastic shortening of superior quality.

A further object is to provide an all-vegetable puff pastry plastic shortening possessing desired keeping quality and superior spring without being waxy at body temperature or too hard or brittle under normal conditions of use.

A still further object is to produce a puff pastry shortening having lower melting characteristics and greater solubility in fatty media, thereby contributing to greater absorption and utilization or digestibility of the fat on internal consumption.

I have discovered that vegetable oils of the semi-drying and drying oil classes having saponification values from about 185 to about 200 and iodine values from about 105 to about 140, and mixtures thereof, when partially hydrogenated to an iodine value from about 65 to about 85, may be subjected to the low temperature interesterification process previously referred to to produce a modified triglyceride which, when plasticized, is superior in quality to existing all-vegetable puff pastry shortenings of which I am aware.

In the practice of the present process a triglyceride mixture consisting essentially of a vegetable oil such as cottonseed oil, soybean oil, sunflower seed oil, corn oil, sesame oil, and the like, or a mixture of same, is first hydrogenated to an iodine value from about 65 to about 85, preferably from about 75 to about 80. Although not essential, it is preferable that the hydrogenation be conducted under conditions (e. g. low temperature and short time) which are known to produce a minimum amount of triglycerides containing high melting unsaturated combined fatty acids such as isooleic acid. This partially hydrogenated fat is then subjected to low temperature interesterification, as more fully set forth in my copending application Serial No. 562,062. Under the proper conditions of treatment, rearrangement of fatty acid radicals of the oil is directed and controlled to achieve results not heretofore obtained in the field herein concerned. For example, when the partially hydrogenated, vegetable oil, at least a substantial part of which is liquid, is admixed with a suitable catalyst and interesterification is permitted to take place at a temperature below that at which the liquid phase is saturated with respect to relatively high melting triglycerides, such high melting triglycerides formed in the course of the interchange of fatty acid radicals crystallize from the liquid fat and take no further part in the interchange process. Thus as molecules having low solubility in the liquid fat phase are formed and crystallize out of solution, further rearrangement of such molecules is prevented. Consequently the percentage of higher melting molecules in the whole fat mixture tends to increase as long as crystallization continues with resulting increase in melting point of the whole fat. Crystallization of such relatively insoluble solid triglycerides can continue as long as the solubility thereof in the liquid fat phase at the temperature of reaction is exceeded by the amount newly set formed in the reaction. After the desired change in characteristics has been effected, the catalyst is inactivated and the oil is preferably processed further under known conditions such as refining, bleaching, chilling and plasticizing to convert it into an edible plastic shortening.

Efforts to duplicate products of the present invention by mixing various esters of the fatty acids in the correct proportions to give a product having the composition of partially hydrogenated vegetable oil, and at the same time having the characteristics desired in the shortening products produced from the interesterified oil have not been successful. An analysis of the conditions existing during preparation of the products according to the present invention may indicate the reason why. For example, in the practice of low temperature interesterification on a partially hydrogenated vegetable oil in accordance with this invention, the triglycerides which precipitate during reaction and which therefore have a dominating influence on the characteristics of the final product are not necessarily the highest melting triglycerides which are or can be formed from the constituent fatty acids of the fat, but rather glycerides whose crystallographic properties have favored their precipitation. Therefore, without knowledge of the kinds and proportions of triglycerides which actually result from the practice of low temperature interesterification on the partially hydrogenated vegetable oils, it is impossible to synthesize the compositions resulting in the practice of this invention. In fact, as far as I am aware, a puff pastry plastic shortening having all of the desirable qualities of the products of the present invention has not been made directly from vegetable oil by any method of synthesis. Accordingly it is believed that the instant products are basically new.

Application of low temperature interesterification to the partially hydrogenated vegetable oils in accordance with this invention causes reconstruction of the triglycerides so that the solid combined fatty acids apparently have increased effectiveness in imparting to the fat the desired quality of spring. Accordingly in the products of the present invention, the final melting point of the triglyceride mixture may be lower than that of the triglycerides in conventional all-vegetable puff pastry shortenings, which in general melt above 120° F., without sacrificing the quality of spring. Consequently the resulting fat, even though predominantly unsaturated, is an all-hydrogenated fat and possesses good natural keeping quality as regards rancidity development of more than 40 hours, has spring in excess of the minimum of 9 desired by the trade, has good workability at low temperatures such as 50° F., good plasticity over a wide range of temperature, and is relatively low melting thereby contributing to greater absorption and utilization or digestibility on internal consumption, a combination of characteristics long desired but not heretofore realized in an all-vegetable puff pastry shortening.

More specifically, the products of the present invention may be differentiated over prior art products by spring in excess of 9, capillary melting points of the fat not substantially higher than 117° F. (determined by the American Oil Chemists' Society Closed Capillary Method as of Jan. 1, 1944), lack of waxiness at body temperature, a change in plastic consistency of not substantially more than 100 points with change in temperature from 50°–80° F. as determined with the use of the A. S. T. M. grease penetrometer, a penetration at 50° F. not substantially lower than 65, and a stability of at least 40 hours.

Before the invention is illustrated with specific examples, it is deemed advisable to set forth in detail the method used for testing the shortening products for spring, that is, the inches of combined height of five patty shells prepared with the use of the shortening.

In the determination of spring, patty shells are made as follows: A dough is first prepared from 1 lb. 8 oz. of cake flour, ¾ oz. salt, 2 oz. whole eggs, 3 oz. of puff pastry shortening, 12 oz. ice water. At a temperature of about 75°–80° F. the flour, salt, eggs, and shortening are placed in a large bowl of a 4-speed, model G, 16–36 quart, Giant Century mixer equipped with paddle agitator, and mixed at second speed, the ice water being slowly added. After the water has been added, the mixer is shifted to third speed, and when the dough forms a ball a further shift to fourth speed is made. Mixing at this speed is carried on for 45 seconds.

The dough, amounting to about 2½ pounds, is removed from the mixer and wrapped in a floured wax paper and allowed to relax for one hour at 75°–80° F. Thereafter it is rolled out over an area 15 x 21 inches. This rectangular area may be considered as being made up of three sections, one center and two end sections, each 15 x 7 inches. One pound of the puff pastry shortening to be tested is spread over the center and one of the end sections, that is over about ⅔ of the dough. The uncovered end section of the dough is folded over the covered center section to form two layers of dough separated by a layer of shortening. The remaining covered end section of dough is then folded over to form a third layer of dough separated by a second layer of shortening. The edges of the folded dough are then pressed together to seal in the shortening. This process of folding is termed "folding in threes."

The folded piece is then rolled out over a rectangular area 15 x 21 inches and again folded in threes. The process is repeated for a third time after which the folded piece of dough and shortening is dusted lightly with flour, wrapped in wax paper and allowed to relax over night at 75°–80° F.

The following morning the process of folding in threes is carried out for a fourth and a fifth time after which the product is wrapped as above, allowed to relax for one hour at 75° to 80° F., then rolled and again folded in threes for a sixth time.

The product is rolled to ¼ inch thickness. About one third of the rolled dough, out of which the bottoms of the patty shells are to be made, is separated and rolled to 1/16 inch thickness. Disks 86 mm. in diameter are cut out.

The section of dough rolled to ¼ inch thickness is used in making the sides of the patty shells. First, disks 86 mm. in diameter are cut out and from each of these disks a center section 59 mm. in diameter is removed to produce a doughnut shaped piece ¼ inch thick with outside and inside diameters of 86 and 59 mm. respectively. This side piece is then placed on top of one of the bottom disks after the top side of the latter has been brushed with water. The two pieces are lightly pressed together to form the patty shell and allowed to rest on a pan for one hour at around 80° F. They are then baked at 400° F. for 35 minutes. The combined height of five patty shells so prepared and baked, expressed in inches, constitutes the spring of the shortening tested. In general, products of the present invention have spring in excess of 11.

*Example 1.*—A sample of refined and filtered cottonseed oil was catalytically hydrogenated at about atmospheric pressure and 165° C. to an iodine value of 76.3. The product had a capillary melting point of 34.0° C. and a cloud point of 12.9° C. The product also contained, by analysis and calculation, 10.0% combined isooleic acid. This hydrogenated oil was chilled to produce a cloud of crystallized material, then heated to about 90° F. to dissolve all but the higher melting solid glycerides precipitated. To the thus treated oil was added 0.3% sodium methoxide as a 10% suspension in xylene. The mixture was charged to a cylindrical container adapted to be rotated on its axis and thereby gently agitate the contents. The reaction was permitted to take place at 90° F. for one day, then at 80° F. for one day, and then at 70° F. for two days. The reaction mix was then treated with glacial acetic acid in an amount substantially equivalent to the sodium methoxide employed, thereby inactivating the catalyst. The oil was then refined, bleached and deodorized. The product had the following characteristics:

Capillary melting point _____ 45.5° C. (113.9° F.)
Cloud point _____ 28.7° C.

The marked increase in melting point and cloud point effected by the interesterification process is readily apparent.

This interesterified oil was heated to about 138° F., and converted into a plastic product by chilling on a cooled roll at a temperature of about 36° F., working the chilled product in a mechanical device similar to a meat grinder to render the product creamy and to impart plastic consistency and extruding the plasticized product through a die of desired shape. After storage for at least one day at 80° F., samples of the product were brought to various temperatures and plasticity measured with the use of the A. S. T. M. grease penetrometer with the following results:

| ° F. | A. S. T. M. Penetration |
| --- | --- |
| 50 | 82 |
| 60 | 90 |
| 70 | 114 |
| 80 | 116 |
| 90 | 149 |

The shortening had a spring of 11.9 as determined by the method outlined above, was not waxy and did not produce a waxy product. In addition to its excellent spring and freedom from waxiness, the shortening had good working properties at 50° F., and possessed a stability against the development of rancidity due to oxidation in excess of 40 hours.

*Example 2.*—Refined and filtered soybean oil was catalytically hydrogenated at about atmospheric pressure and about 165° C. to an iodine value of 76.0. The product had a capillary melting point of 38.3° C. and a cloud point of 19.1° C. and contained, by analysis and calculation, about 26.7% combined isooleic acid. This hydrogenated oil was subjected to interesterification as in Example 1, except that the interesterification was started at 80° F. and permitted to take place at this temperature for about ⅔ of a day and then for 3 days at 70° F. The product was refined, bleached, and deodorized. The resulting oil had a capillary melting point of 44.4° C. (112.0° F.) and a cloud point of 28.6° C.

This interesterified oil was converted into a plastic shortening product by chilling on a cooled roll at a temperature of about 35° F., working the chilled product in a mechanical device similar to a meat grinder to render the product creamy and to impart plastic consistency and extruding the plasticized product through a die of desired shape. The product was tempered at 80° F. for 3 days.

The plastic shortening thus produced had the following penetration characteristics as determined with the A. S. T. M. grease penetrometer:

| ° F. | A. S. T. M. Penetration |
| --- | --- |
| 50 | 69 |
| 60 | 84 |
| 70 | 116 |
| 80 | 136 |

The shortening had a spring of 12 and was not waxy at body temperature and did not produce waxy puff pastry products.

In addition to its excellent spring and freedom from waxiness, the shortening had good working properties from 50 to 80° F. and possessed excellent stability (in excess of 40 hours) against the development of rancidity due to oxidation.

Instead of the hydrogenation conditions used in Example 2, other conditions of hydrogenation involving higher pressure such as 25 to 150 pounds per square inch and lower temperature such as 90° to 120° C. or other conditions effecting an increase in the hydrogenation rate and a reduction in the formation of isooleic acid glycerides may be used without departing from the spirit of the invention.

Products having the characteristics of those described in Examples 1 and 2 may be prepared in substantially the same way from partially hydrogenated corn oil, sunflower seed oil, sesame oil and the like or vegetable oil mixtures having substantially the same characteristics.

The above examples describe the preparation of a dry puff pastry shortening. It has been found, however, that the inclusion of about 4 to 5 per cent of water, preferably incorporated in the fat just prior to the chilling step, increases the tolerance of the shortening against changes in baking procedure. Accordingly a wet shortening may be preferred and such may be prepared from the triglyceride mixtures of my process without departing from the spirit of the invention. In general, the addition of the water causes a significant softening of the shortening and effects an increase of about 10 to 15 units in the penetration values, but the spread in pentration values from 50° F. to 80° F. is not changed significantly.

If it is desired to increase or decrease the melting point of the mixture of triglycerides in the products produced in accordance with this invention, it is possible to accomplish this end within limits by hydrogenating the oil to a greater or lesser degree, or by conducting the interesterification process at lower or higher temperature. It is to be understood, however, that the melting point should not be increased to such a degree that the product may have a waxy consistency which may be observed in the pastry produced therefrom.

As indicated above, the final melting point or spring or working characteristics alone cannot be used as a basis for determining the suitability of the product of the present invention for use in the manufacture of puff pastries. All characteristics must be taken into account in order that the product produced may have the overall excellent quality desired.

In the process above described, the temperature at which most of the partially hydrogenated oils can begin to form solid crystals in the interesterification process is below 120° F. and therefore the temperature at which the reaction is conducted for most practical applications is below 120° F. but sufficiently high that a substantial proportion of the fat is liquid and sufficiently low to permit the crystallization from the liquid fat of solid triglyceride fats of low solubility formed in the interesterification. It has been found, for example, that the reaction will take place at temperatures at which the mixture appears to be solid but actually contains liquid fat entangled in the crystals of precipitated solid glycerides.

In the above examples then the maximum final temperature at the completion of the interesterification is in the neighborhood of 70° F. Lower temperatures may be employed if an increase in the melting point of the oil is desired or if the oil is of such character as to require interesterification at lower temperature to avoid melting points which are too low. Similarly temperatures higher than 70° F. may be employed to produce products of lower final melting point or to avoid melting points which are too high. However, for those vegetable oils which have been hydrogenated to the preferred iodine value of 75–80, optimum results are obtained by running the interesterification to a final temperature of about 70° F.

The examples given above show that the partially hydrogenated oil is seeded with solid glycerides prior to contact with the catalytic material. Although this method of operation is preferred, the process is not so limited, and other schedules of temperature control without seeding including sudden or gradual cooling to final interesterification temperature may be used provided the increase in solid triglycerides and increase in melting point are not so great that the product is rendered waxy at body temperature.

Effective practice of the interesterification step in the present invention does not depend upon the use of any particular catalyst. Any material which will promote the interchange of fatty acid radicals at the low temperatures required for crystallization during interesterification is suitable for use.

My copending application, Serial No. 628,372, fully discusses the subject of catalysts and points out that the true catalyst for the interesterification may be the product of the reaction of the triglyceride or of minor constituents, such as tocopherols and sterols, with the catalytic material added. Whatever may be the true catalyst, it can be shown that substances which are effective in bringing about the interesterification include compounds which include sodium or potassium, for example, combined with practically any material less acidic than phenol. Thus various alkoxides such as sodium, potassium, and lithium methoxides, ethoxides, propoxides, and butoxides are suitable, as are alkoxides made from alcoholic compounds in general such as lauryl alcohol, ethylene glycol, oleic acid monoglyceride, and many others. Also, alkoxides in which the cation is the tetrasubstituted ammonium radical such as tetramethyl ammonium methoxide and lauryl benzyl dimethyl ammonium methoxide show activity in promoting the interesterification reaction. Other substances which may be added to further the interesterification reaction at low temperature are: alkali-metal-organic compounds containing the alkali metal atom directly bound to a carbon atom as in triphenyl methyl sodium or to a nitrogen atom as in potassium pyrrole; finely divided metallic potassium or sodium in xylene; and an anhydrous suspension of potassium hydroxide in a hydrocarbon solvent such as undecane.

Because of the great variety of materials that may be used to form the active catalyst, and because the actual structure of the true catalytic material is as yet not accurately known, the catalytic materials are generically referred to in the claims as "low temperature interesterification catalysts."

Amounts of interesterification catalyst equivalent to 0.5 per cent by weight of sodium methoxide based on the weight of the fat may be employed, but there is no particular advantage in employing quantities much in excess of 0.3 per cent. Even small quantities such as 0.03 per cent, if not inactivated by impurities in the fat, such as moisture, are effective in promoting the rearrangement at low temperature, but I have found that the reaction proceeds at a rather low rate unless at least 0.05 per cent is employed. My preferred range of catalyst usage is the equivalent of from about 0.05 per cent to about 0.5 per cent of sodium methoxide.

The catalysts that are used in practicing the present invention are highly efficient in effecting regrouping of fatty acid radicals in the triglycerides, and for this reason it is preferable to render the cataylsts inactive after the desired rearrangement has taken place and before the temperature of the fat is allowed to rise appreciably so that substantially no modification results during subsequent handling of the fat. In order to retain the degree and kind of rearrangement effected at low temperature, it is preferable to treat the mixture containing the catalyst with water or an acid reacting compound such as hydrochloric acid, phosphoric acid, carbonic acid, glacial acetic acid, etc., and thereby inactivate the catalyst before any undesirable reversion or other change in the desired molecular arrangement takes place.

In the use of the alkoxide catalysts in the practice of the invention, the usual precautions of having the oil dry and neutral, the catalyst finely divided and well dispersed, and of excluding oxygen and carbon dioxide during the reaction should be observed in order to achieve optimum results.

Products resulting from the interesterification process as applied to the hydrogenated oils may not be suitable for direct use as an edible product due to undesirable odor, fatty acid content, or other factors. However, conversion into an edible product may be effected in the customary manner by alkali refining, filtering, or bleaching and deodorization with steam at elevated temperature under reduced pressure. Thereafter the product is converted into plastic form (wet or dry) and in this connection the invention is not limited to any particular method of processing. Any of the ordinary methods employed for this purpose in the industry are satisfactory, the most common method being passage of the fat over a chilled roll and through a mechanical working device, such as a picker box arrangement, and passage through a processing apparatus such as that disclosed in Reissue Patent 21,406, issued to Clarence W. Vogt.

In the chilling of the rearranged hydrogenated vegetable oil preparatory to converting it into a plastic product, I have found it preferable to chill the fat rapidly to a temperature not substantially higher than 45° F. before or during agitation. Chilling temperatures substantially above 45° F. usually result in products which are too firm or stiff at temperatures of 50° to be suitably rolled with the dough in the preparation of the pastry product prior to baking.

Having thus described my invention, what I claim and desire to secure by Letters Patent, is:

1. As a product of manufacture suitable for use as a puff pastry shortening, an all-vegetable triglyceride oil originally having a saponification value from about 185 to about 200 and an iodine value from about 105 to about 140, and hydrogenated to an iodine value from about 65 to about 85, said hydrogenated oil having been subjected to molecular rearrangement, by intimately contacting it with a low temperature interesterification catalyst at a temperature below 120° F., within a range of temperatures of which the lower limit is the lowest temperature at which a portion of the said oil is liquid and the upper limit is the highest temperature at which higher melting triglyceride molecules can crystallize in the liquid oil as they are formed by interesterification, said temperature being maintained while progressive crystallization of substantially completely saturated triglycerides takes place and until a substantial increase in the proportion thereof has occurred, followed by inactivation of said catalyst and remelting of the mixture of solid and liquid triglycerides, the so-treated hydrogenated product, by reason of such molecular said increased quantity of substantially combined fatty acid constituents concentrated in said increased quantity of substantially completely saturated triglycerides, and having a capillary melting point higher than that of the initially hydrogenated oil, but not substantially higher than 117° F.

2. The product claimed in claim 1 having an iodine value of 75 to 80.

3. As a puff pastry plastic shortening, an all-vegetable triglyceride oil originally having a saponification value from about 185 to about 200 and an iodine value from about 105 to about 140, and hydrogenated to an iodine value from about 65 to about 85, said hydrogenated oil having been subjected to molecular rearrangement, by intimately contacting it with a low temperature interesterification catalyst at a temperature below 120° F., within a range of temperatures of which the lower limit is the lowest temperature at which a portion of the said oil is liquid and the upper limit is the highest temperature at which higher melting triglyceride molecules can crystallize in the liquid oil as they are formed by interesterification, said temperature being maintained while progressive crystallization of substantially completely saturated triglycerides takes place and until a substantial increase in the proportion thereof has occurred, followed by inactivation of said catalyst and remelting of the mixture of solid and liquid triglycerides, the so-treated hydrogenated product, by reason of such molecular rearrangement, having its higher melting combined fatty acid constituents concentrated in said increased quantity of substantially completely saturated triglycerides, having a capillary melting point higher than that of the initially hydrogenated oil, but not substantially higher than 117° F., and in plastic form having a spring in excess of 9, a penetration value at 50° F. as measured on the A. S. T. M. grease penetrometer not substantially lower than 65, and showing a change in plastic consistency of not substantially more than 100 points penetration with change in temperature from 50° F. to 60° F. as measured on the A. S. T. M. grease penetrometer.

EDDY W. ECKEY.

REFERENCES CITED

The following references are of record in the file of this patent:

UNITED STATES PATENTS

| Number | Name | Date |
|---|---|---|
| 2,154,452 | Jenness | Apr. 18, 1939 |
| 2,309,949 | Gooding | Feb. 2, 1943 |

Certificate of Correction

Patent No. 2,442,537.  June 1, 1948.

EDDY W. ECKEY

It is hereby certified that error appears in the printed specification of the above numbered patent requiring correction as follows: Column 10, line 32, strike out the words "said increased quantity of substantially" and insert instead *rearrangement, having its higher melting*; and that the said Letters Patent should be read with this correction therein that the same may conform to the record of the case in the Patent Office.

Signed and sealed this 17th day of August, A. D. 1948.

[SEAL]

THOMAS F. MURPHY,
*Assistant Commissioner of Patents.* tion with change in temperature from 50° F. to 60° F. as measured on the A. S. T. M. grease penetrometer.

EDDY W. ECKEY.

REFERENCES CITED

The following references are of record in the file of this patent:

UNITED STATES PATENTS

| Number | Name | Date |
|---|---|---|
| 2,154,452 | Jenness | Apr. 18, 1939 |
| 2,309,949 | Gooding | Feb. 2, 1943 |

Certificate of Correction

Patent No. 2,442,537. June 1, 1948.

EDDY W. ECKEY

It is hereby certified that error appears in the printed specification of the above numbered patent requiring correction as follows: Column 10, line 32, strike out the words "said increased quantity of substantially" and insert instead *rearrangement, having its higher melting*; and that the said Letters Patent should be read with this correction therein that the same may conform to the record of the case in the Patent Office.

Signed and sealed this 17th day of August, A. D. 1948.

[SEAL]

THOMAS F. MURPHY,
*Assistant Commissioner of Patents.*